Sept. 12, 1972            D. E. SAYRE            3,691,050

APPARATUS AND METHOD FOR THE REMOVAL OF IMPURITIES FROM LIQUIDS

Filed Feb. 25, 1970            2 Sheets-Sheet 1

INVENTOR
DAVID E. SAYRE

BY
Oberlin, Maky, Donnelly & Renner
ATTORNEYS

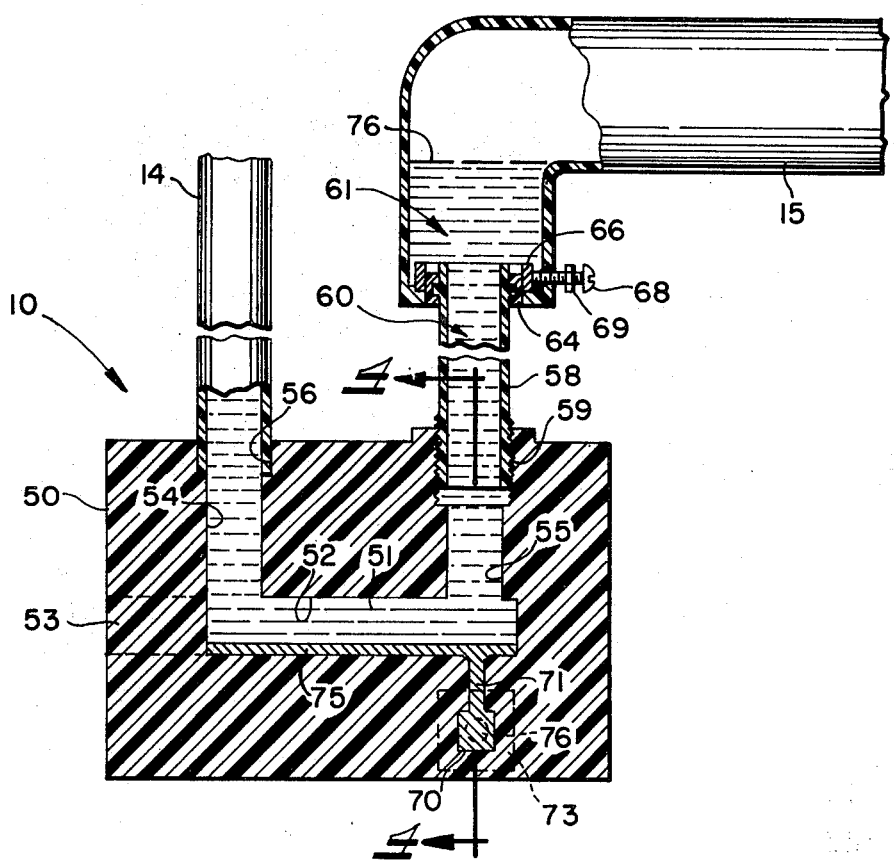
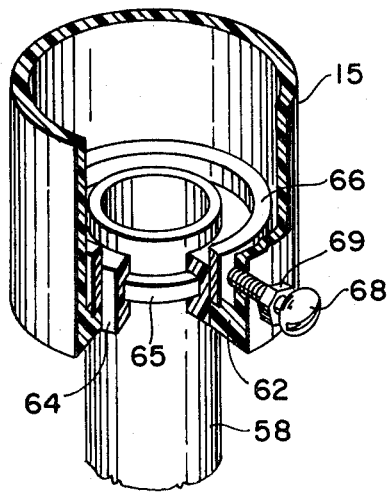
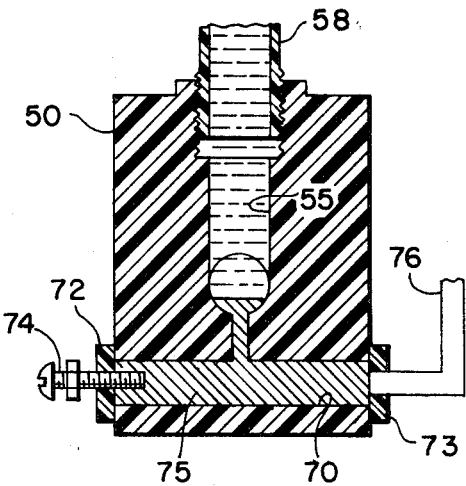
INVENTOR
DAVID E. SAYRE

3,691,050
APPARATUS AND METHOD FOR THE REMOVAL OF IMPURITIES FROM LIQUIDS
David E. Sayre, Austin, Tex., assignor to Sayreco, Inc., Austin, Tex.
Filed Feb. 25, 1970, Ser. No. 14,052
Int. Cl. C02c 5/12; C22d 1/04
U.S. Cl. 204—219         8 Claims

ABSTRACT OF THE DISCLOSURE

The method and apparatus for the continuous purification of water wherein the water is introduced under pressure to a treatment cell having a lower anode of mercury and a stack culminating in a silver ring cathode, the electrodes being energized from a high voltage DC source. Diffused mercury particles act as a catalyst for the flocking of impurities in the water in the presence of the electric field. The treated water then is presented in turn to a settlement tank and an activated carbon filter for removal of solids and further treatment for taste and odor.

---

This invention relates to a water purification method and apparatus and more particularly to an electric field water purification system utilizing a liquid metal electrode as a catalyst for aiding the flocking process.

This apparatus is designed to precipitate all organic and inorganic elements contained as impurities in the usual sources of water by means of coagulating or flocking the impurities into larger particulate bundles which can be effectively screened or filtered for separation of the pure water. The water is first presented at a metallic liquid interface in a turbulent condition to effect a particularization of the metallic liquid and a diffusion of same throughout the water, such particulate then acting as a catalyst for affecting the electron distribution of the molecules of the impurities so as to enhance the action of the electric field in causing precipitation.

The apparatus of this invention is useful in separating out the different elements in sewage and other contaminated waters; in separating out the different elements in the ocean and sea waters; and in extracting metallic elements such as gold, silver, platinum, iron, etc. from naturally occurring water sources. The electronic procedure utilized in this invention has been found useful in eliminating contaminants such as salts, sodas, borons, sulfides, chlorides, fluorides, arsenides, iodides as well as all metallic elements including the precious and lesser metals. Further the apparatus is operative on a continuous basis and can be designed to economically handle water flows of from five to ten gallons per minute to thousands of gallons per minute.

In the preferred embodiment of the invention mercury is utilized as the metallic liquid catalyst, acting also as one electrode in the electric field and the only essential further requirements for the system are to maintain an adequate reserve of the mercury and provide suitable electrical energy for application to the electrodes, DC power being readily realized from a step up transformer and rectifier arrangement. The treated water containing the flocked particulate in then directed to settlement tank which includes a trap for separating the sediment from the pure water together with a mercury trap for reconstituting the catalyst element. The pure water from the settlement tank is then directed to an activated carbon filter system as the final filtering stage wherein any remaining odors or tastes in the purified waters are removed.

It is one object of this invention to provide an improved method for purification of water wherein a metallic liquid catalyst is dispersed in the water and an electric field is applied to cause flocking of impurities.

It is another object of this invention to provide water purification apparatus for combining the action of a metallic liquid and an electric field upon the water to be treated.

It is yet another object of this invention to provide improved water purification apparatus wherein one electrode in an electric field treatment zone is a metallic liquid.

It is still another object of this invention to provide continuous water treatment apparatus wherein a metallic liquid is suspended in the water and in an electric field treatment zone for flocking and separation of impurities.

A still further object is the provision in such apparatus of a water column wherein such suspension is obtained by gravitational balance of the metal versus the water flow.

To the accomplishment of the foregoing and related ends, the invention, then comprises the features hereinafter fully described, the following description and the annexed drawings setting forth in detail certain illustrative embodiments of the invention, these being indicative, however, of but a few of the various ways in which the principles of the invention may be employed.

In the drawings FIG. 1 is a schematic drawing of the components forming the apparatus of this invention suitable for use on a relatively small scale, utilizing only a single treatment cell.

FIG. 3 is an elevational view, partly in cross-section, showing the treatment cell and portions of the connecting tubing with the liquid metal and water therein in static condition.

FIG. 4 is a cross-sectional view of a portion of the treatment cell taken along the lines 4—4 of FIG. 3, and FIG. 5 is a perspective view, with parts cut away, showing the upper electrode region of the treatment cell.

Figure 1:
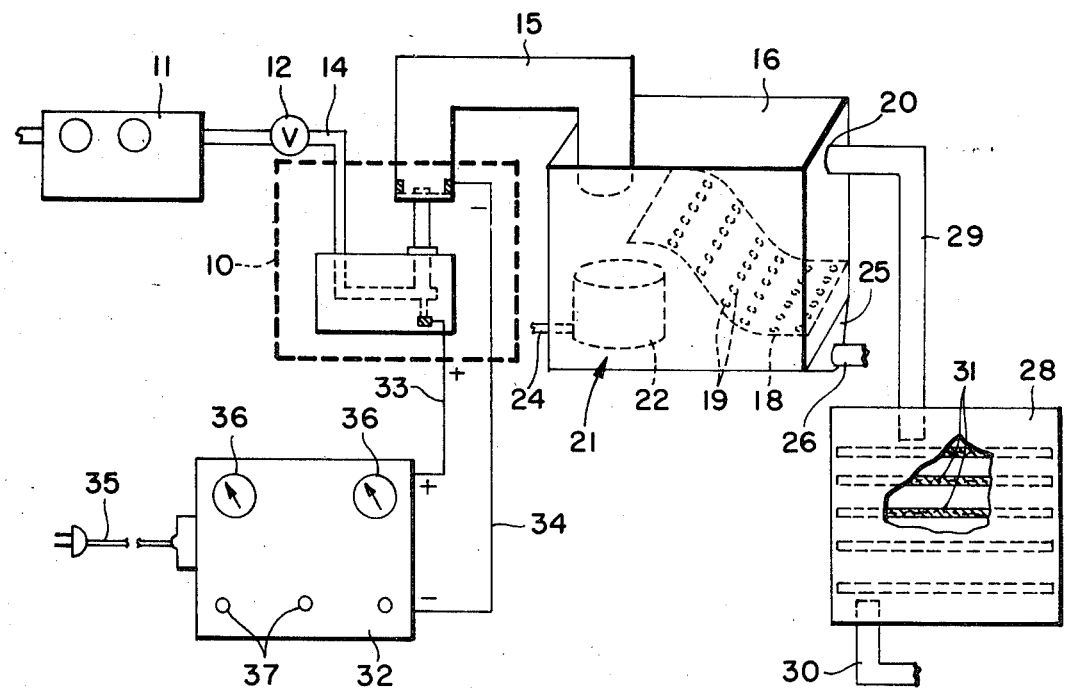

Referring now to FIG. 1, there is shown the general interconnection scheme of components forming the apparatus of this system wherein a water treatment cell, shown generally within the dashed block 10, receives water to be treated from a source of supply (not shown) by way of a pumping system 11 and regulating valve 12 at an inlet tube 14. For most economical and efficient use of the apparatus, preferably the water is supplied to the system at a regulated value by means of the pump 11 and valve 12, however it will become apparent that a gravity fed system may be accommodated with variations in water flow and pressure, or that the water could be batch-treated within the teachings of this invention.

In the treatment cell 10, the impurities in the water will be flocked or caused to be coagulated so as to become distinguishable from the pure water desired and readily separable by means of filter devices and the like. In this embodiment of the invention the treated water output from the treatment cell 10 is directed by a length of U-shaped output tubing 15 to a settlement tank 16. The settlement tank 16 includes a baffle 18 schematically shown in FIG. 1, having a plurality of perforations 19 therein for separating the flocked impurities from the pure water, restraining the impurities to the lower portion of the tank 16 while allowing the pure water level to rise to an outlet port 20.

The settlement tank 16 also includes a metallic liquid trap 21 therein comprising a cylindrical container 22 disposed beneath the discharge end of the output tubing 15. The upper end of the container 22 is open and allows the flocked impurities and water to overflow into the settlement tank 16 while retaining heavier metallic liquid particles and impurities attracted thereto in the lower portion of the container 22 and which may be withdrawn by means of a cleanout tube 24. The metallic liquid obtained in this manner may be reconstituted through a washing and cleaning procedure and be returned for further utilization in the treatment cell 10. Further, the settlement tank 16 is constructed with a trough 25 at the lower portion thereof and fitted with an outlet tube 26 for retrieval of the impurity material which settles to the bottom and which may be disposed of externally of the system by means of separation for recovery of the valuable deposits contained therein or for incineration. Although the water realized from the settlement tank 16 is in a relatively pure state often it is not yet suitable for use in community water systems in that residual odors or tastes or even deceased bacterial bodies may be contained therein. For this purpose a final filter unit 28 is connected to the settlement tank 16 by means of overflow tubing 29 from the outlet port 20, the filter 20 having discharge tubing 30 for passage of the purified water to a utilization area. The filter 28 may comprise a multi-layer, gravity-fed, full-flow filter, the elements 31 comprising the filter being formed of activated carbon having an extremely high surface area for contact with the water, which elements 31 may be periodically removed and/or replaced under a predetermined maintenance schedule.

Further forming a part of the system and energizing the same is a power supply 32 which provides a direct current output voltage on lines 33, 34 which are connected to portions of the treatment cell 10 for establishing the electric field of energy in which the treatment process occurs. The power supply 32 in this embodiment of the invention may be of relatively small capacity having a power cord 35 for connection to conventional power lines and comprising simply a step-up transformer and rectifier arrangement. Meters 36 for monitoring voltage and current flow levels and suitable adjustment controls 37 for varying the output levels are provided. In a larger scale system a correspondingly larger power supply would be required, however, it is only significant that suitable operating potentials be supplied on the output lines 33, 34 and that provision be made for a reversal of the polarity of the output lines for purposes to be described hereinafter.

Figure 2:
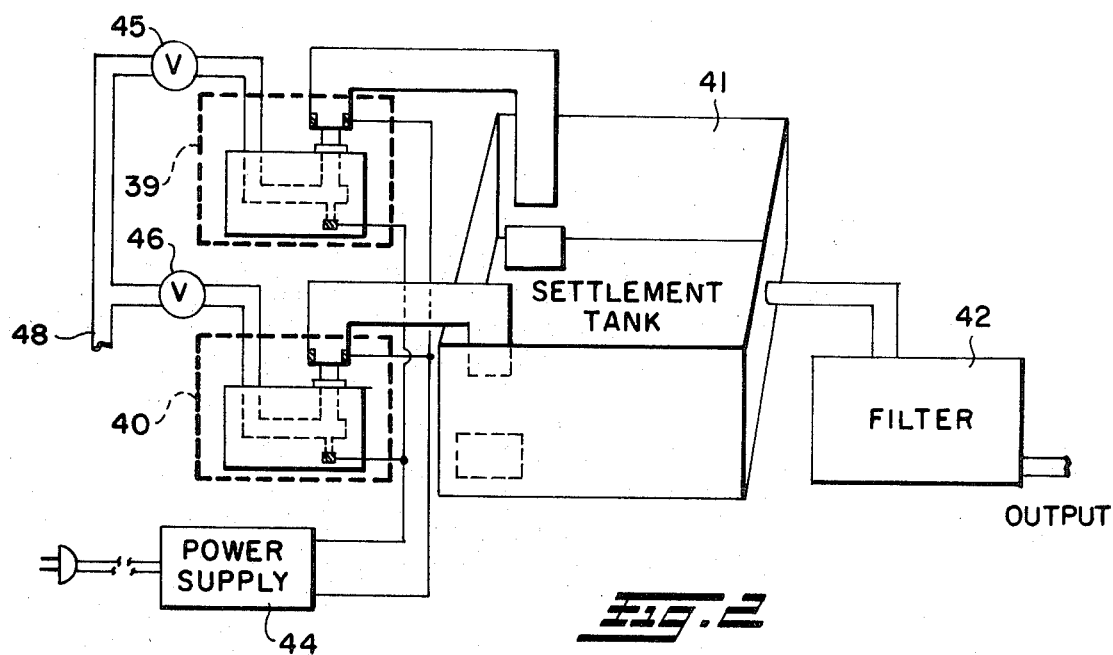
FIG. 2 is a schematic drawing of the system on a larger size to accommodate any flow of water output, showing the interconnection of more than one treatment cell.

Such a larger scale system is generally depicted in FIG. 2 wherein several treatment cells 39, 40 are shown indicating that any number could be utilized in association with a settlement tank 41 and output filter 42 or a plurality of the latter, all treatment cells 39, 40 being energized in common from a single power supply 44. It is desirable to control the flow of input water to each of the treatment cells 39, 40 to achieve optimum utilization of same and accordingly individual metering valves 45, 46 are associated with each treatment cell, receiving the water to be treated from a common conduit 48. In a system of this type it is apparent that provision can be made for switching in individual treatment cells 39, 40 when desired for attaining a certain capacity of operation or that certain of the cells may be removed from operativeness for replacement or cleaning procedures while maintaining the overall system operative.

Referring now to FIGS. 3, 4 and 5, there are shown several views of the treatment cell 10 and details thereof from which it will be clear how the water purification process occurs. A generally rectangular block 50 of cast plastic material, preferably of Lucite, forms the major portion of the treatment cell 10, the block 50 having a central chamber 51 therein for receipt of the water to be treated and for an initial phase of the treatment process. The chamber 51 may be formed of a blind bore 52 in the block 50 extending in a generally horizontal direction and being closed at the left end as viewed in FIG. 3 by a plug 53 to provide a receptacle for the water. A pair of vertically oriented bores 54, 55 communicate with the chamber 51 at either end thereof for the introduction and removal of water, the inlet bore 54 including a recess 56 for receipt of the inlet tubing 14 being sealed in engagement with the block 50 for a watertight connection.

The upper end of the outlet bore 55 is threaded and receives a vertically extending length of plastic tube 58 in turn having threads 59 at the lower portion to provide a passage 60 in which a portion of the treatment process occurs. The passage tube 58 may be adjusted relative to the block 50 by the depth of penetration of the threads 59 thereby providing an adjustment for the overall length of the passage 60 from the chamber 51 within the block 50 to the top portion of the tubing 58.

Mounted at the upper portion of the passage tube 58 is the U-shaped outlet tube 15 for discharge of the water to the settling tank 16, the diameter of the outlet tube 15 being somewhat greater than the diameter of the passage tube 58 so as to create a chamber 61 at the top of the passage 60 at which there is reduced velocity of water flow and thus a pressure drop, thereby providing an initial settlement area. The outlet tube 15 contains a flange 62 at its inner periphery and is supported on the passage tube 58 in sealing engagement therewith by means of an intermediate notched collar 64 in turn mating with a flange 65 on the periphery of the passage tube 58 only slightly below its upper end. Such arrangement allows the passage tube 58 to be rotated with respect to the outlet tube 15 and the block 50 for adjustment of the length of the passage 60.

Further mounted adjacent the upper end of the passage tube 58 is the upper electrode 66 for the electric field comprising a ring of conductive material, preferably silver, secured between the collar 64 and a stepped portion of the flange 62 of the outlet tube 15. A screw 68 is threaded into the electrode ring 66 for electrical connection therewith passing through the outlet tube 15 and containing a clamping nut 69 thereon for securing a connecting wire. Other materials of lesser grade may be utilized as well for the electrode ring 66. However, silver is preferred as establishing an optimum contact with the water to be treated and not being as subject to the build up of non-conductive deposits thereon.

Preferably the upper surface of the electrode ring 66 is slightly depressed below the upper end of the passage tube 58 so as to create a path for electrical current flow through a portion of the water contained within the chamber 61 as well as down through the passage 60 into the chamber 51 of the treatment cell 10.

Further forming a part of the treatment cell 10 is a reservoir for the lower electrode comprising a transversely extending aperture 70 passing through the block 50 and communicating with chamber 51 by means of a vertical duct 71. Either end of the aperture 70 is closed by caps 72, 73 of plastic material bonded to the block 50, cap 72 having a screw 74 threaded therein and extending into the aperture 70 for electrical connection with metallic liquid 75 located therein and adapted for connection to the power source. The second cap 73 also bonded to the block 50 receives an elbow filler tube 76 through which the metallic liquid 75 is introduced and by means of which the proper level of same within the chamber 51 is maintained. As shown in FIGS. 3 and 4 sufficient metallic liquid 75 is introduced in the chamber 51 so as to present a reasonably large surface area of the metal for exposure to the water to be treated. In the preferred embodiment of this invention, the metallic liquid 75 is mercury, however, other metals may be utilized as well depending on the temperature of utilization including bismuth and antimony.

It will be understood then that when the upper electrode 66 is connected as the cathode to the negative potential line 34 of the power source 32 and the lower liquid electrode 75 is connected as the anode to the positive potential line 33 an electric field will be established in the passage 60 and in the chamber 61 within the outlet tube 15 generally in the region defined by the respective electrodes. Thus, as water to be treated is introduced to the system, a water level is obtained completely filling the treatment chamber 51 in the block 50, the vertical bores 54, 55, the passage tube 58, and the outlet tube 15 to a level 76 where the water will flow through the horizontal section of the outlet tube 15 to the treatment tank 16.

Much of naturally occurring water is generally alkaline in nature having a deficiency of electrons due to the electron exchange which has occurred as the water has come in contact with the various minerals and metallic elements, and during its conditioning during treatment in various industrial plants and the like. Many of the molecules will have already bonded together acting on an electron sharing basis with adjacent molecules resulting in an electron unbalance but providing a relatively stable material which is often associated with the formation of deposits within any water carrying lines. The turbulent action of the entrance of water into the chamber 51 by way of the inlet bore 54, due to the head of pressure acquired either through physical displacement of the water or the application of power thereto, will cause an agitation of the water molecules and the materials suspended or in solution therein with the mercury electrode 75 at the lower portion of the chamber 51. Such action will cause turbidity in the chamber 51 wherein the mercury is caused to be particularized in part and diffused throughout the water contained within the chamber 51 causing some flocking of the material in the water. The thus partially treated water is further carried into the vertical passage 60 between the electrodes 66, 75 and subjected to the electric field causing a further ion transfer within the material and major flocking wherein the material is bunched into larger and larger particles. This process will be further continued in the initial settlement chamber 61 in the lower portion of the outlet tube 15 where the water is still in the influence of the electric field. In operation, the micron size mercury particles appear as a blue haze in the vertically extensible water column 60 and 61 with the gravitational force thereon being essentially balanced against the upward flow of water.

It will be appreciated that due to the relative denseness of the mercury particulate, such will tend to flow downwardly in the passage 60 while being subjected to the upward force of the continuously moving water so that substantially a suspension of the mercury particles is obtained throughout the passage 60. It will be apparent also that it is necessary to maintain a regulated flow of water through the system so that the distribution of mercury particles in the passage 60 will be substantially uniform to achieve an optimum effect upon coagulation of the impurities contained in the water. Mercury particles that drop through the passage 60 will be returned to the lower portion of the chamber 51 reforming the liquid electrode 75 at that point, while any mercury particles that may become combined with the impurity materials will present a lesser overall density and be carried with the water flow into the outlet tube 15 to the settlement tank 16. As noted previously, such contaminated mercury particles will be recovered in the mercury trap 21 and after proper cleansing and reconstitution can be returned to the lower electrode supply aperture 70 to maintain the mercury level for the system.

The flocked impurity particles will normally be prevented from falling back through the passage by means of the pressure of the incoming water and will eventually be carried into the initial settlement chamber 61 wherein under reduced flow conditions, such particles will be subjected to the electric field for a longer interval of time so as to receive a maximum flocking effect prior to transport to the settlement tank 16.

Lengthening or shortening of the passage 60 by adjustment of the tube 58 will change the separation of the electrodes 66, 75 and thus the configuration and strength of the electric field, which similarly can be varied by altering the applied voltage. Also it will have an effect upon the time that the water is in the passage 60, being interrelated with the velocity of water flow in the system, and provides a readily available mechanical adjustment for assuring a backflow of the mercury particles to the lower electrode 75 with a minimum overflow to the settlement tank 16 and an optimum flocking effect.

Useful voltages supplied from the power source 32 to the connecting lines 33, 34 have ranged to 2500 volts but typically are on the order of 750 volts, depending on the type of water to be treated, the size of the treatment cell 10 and other influences. Little power however, is required to energize the system and it has been determined that the cost of power will be more than matched by the recovery of materials from the water in many locations.

It is also possible to operate the system in a reverse polarity mode wherein line 33 is made negative with respect to line 34. In this type of operation an enhancement of the attraction between the impurity particles and the mercury particulate is brought about, wherein it is then desired to continuously remove the thus contaminated mercury, treat same for removal of the impurities, and return to the system for reuse.

I therefore particularly point out and distinctly claim as my invention:

1. Apparatus for purifying water and the like comprising a pair of electrodes operative to establish an electric field therebetween, one electrode being liquid metal, a second ring shaped electrode with means of adjusting the distance between the two electrodes and conduit means operative to direct the water into contact with the liquid metal for diffusion of some of the liquid metal into the water and then to direct the water through the remainder of the electric field, said conduit means including a column between said electrodes in which some of the diffused liquid metal effectively can be suspended, the electric field being operative to flock impurities in the water for subsequent removal.

2. Apparatus as set forth in claim 1 further including a settlement tank adapted for receipt of the water from said conduit means for separating out the flocked impurities.

3. Apparatus as set forth in claim 2 further including a filter adapted for receipt of the water from said settlement tank.

4. Apparatus as set forth in claim 3 wherein said settlement tank comprises a container having a perforated baffle therein for straining the water and said filter comprises activated carbon for removing odor and taste from the water.

5. Apparatus as set forth in claim 1 wherein the water is supplied under pressure, further including means at the top portion of said column for reducing the velocity of water flow.

6. Apparatus as set forth in claim 1 including means to adjust spacing between electrodes.

7. Apparatus as set forth in claim 1 including means to cause a pressure drop in said column, the other electrode being a ring adjacent such pressure drop.

8. Apparatus as set forth in claim 1 including a liquid metal sump at the bottom of said column, the electrical connection to said one electrode being through said sump.

References Cited

UNITED STATES PATENTS

| | | | |
|---|---|---|---|
| 759,798 | 5/1904 | Blackmore | 204—250 X |
| 763,026 | 6/1904 | Schweitzer | 204—152 |
| 1,397,815 | 11/1921 | Luckenbach | 204—250 X |
| 1,563,957 | 12/1925 | Bates | 204—250 |
| 1,930,830 | 10/1933 | Twombly | 204—272 |
| 2,093,770 | 9/1937 | Billiter | 204—219 X |
| 3,061,536 | 10/1962 | Gruber | 204—219 X |
| 3,140,991 | 7/1964 | Gardiner | 204—219 |
| 3,464,910 | 9/1969 | Krebs et al. | 204—272 X |

FOREIGN PATENTS

| | | | |
|---|---|---|---|
| 1,000,188 | 8/1965 | Great Britain | 204—219 |

JOHN H. MACK, Primary Examiner

A. C. PRESCOTT, Assistant Examiner

U.S. Cl. X.R.

204—149, 152, 275, 276, 250